US012617182B2

(12) United States Patent
Ikemoto et al.

(10) Patent No.: US 12,617,182 B2
(45) Date of Patent: May 5, 2026

(54) MULTILAYER SUBSTRATE

(71) Applicant: Murata Manufacturing Co., Ltd., Nagaokakyo (JP)

(72) Inventors: Nobuo Ikemoto, Nagaokakyo (JP); Keiichi Ichikawa, Nagaokakyo (JP); Kentarou Kawabe, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 108 days.

(21) Appl. No.: 18/888,325

(22) Filed: Sep. 18, 2024

(65) Prior Publication Data

US 2025/0010577 A1      Jan. 9, 2025

Related U.S. Application Data

(63) Continuation of application No. PCT/JP2023/017214, filed on May 6, 2023.

(30) Foreign Application Priority Data

Jun. 9, 2022    (JP) ................................. 2022-093630

(51) Int. Cl.
*B32B 7/03* (2019.01)
*B32B 15/08* (2006.01)
*B32B 15/20* (2006.01)

(52) U.S. Cl.
CPC ................ *B32B 7/03* (2019.01); *B32B 15/08* (2013.01); *B32B 15/20* (2013.01); *B32B 2398/20* (2013.01)

(58) Field of Classification Search
CPC .... B32B 7/00; B32B 7/03; B32B 7/04; B32B 2307/202; B32B 2307/206
See application file for complete search history.

(56) References Cited

U.S. PATENT DOCUMENTS

2006/0278963 A1    12/2006  Harada et al.
2014/0305686 A1    10/2014  Kitajima

FOREIGN PATENT DOCUMENTS

JP    2002171036 A    6/2002
JP    2006019643 A    1/2006
JP    2006344828 A    12/2006
(Continued)

OTHER PUBLICATIONS

International Search Report in PCT/JP2023/017214, mailed Jul. 25, 2023, 2 pages.

(Continued)

*Primary Examiner* — Adam Krupicka
(74) *Attorney, Agent, or Firm* — Keating & Bennett, LLP

(57) ABSTRACT

In a multilayer substrate, a second multilayer body is positioned in a positive direction of a Z-axis of a first multilayer body. The second multilayer body is fixed to the first multilayer body via a first insulator layer bonded to a second insulator layer. Regions obtained by dividing the first multilayer body into three equal portions in the Z-axis direction are defined as a positive region, an intermediate region, and a negative region. A portion of one or more positive region first conductor layers is located in the positive region. An entirety of one or more intermediate region first conductor layers is located in the intermediate region. A thickness in the Z-axis direction of at least one of the one or more positive region first conductor layers is larger than the thickness in the Z-axis direction of the one or more intermediate region first conductor layers.

17 Claims, 16 Drawing Sheets

(56) References Cited

FOREIGN PATENT DOCUMENTS

| JP | 2014207346 | A | 10/2014 |
|----|------------|-----|---------|
| JP | 2019021863 | A | 2/2019 |
| WO | 2014115433 | A1 | 7/2014 |

OTHER PUBLICATIONS

Written Opinion in PCT/JP2023/017214, mailed Jul. 25, 2023, 4 pages.

10

10a

10b

10c

B

A1

A2

10d

A1a    A2    A1b

MULTILAYER SUBSTRATE

CROSS REFERENCE TO RELATED APPLICATIONS

This application claims the benefit of priority to Japanese Patent Application No. 2022-093630 filed on Jun. 9, 2022 and is a Continuation Application of PCT Application No. PCT/JP2023/017214 filed on May 6, 2023. The entire contents of each application are hereby incorporated herein by reference.

BACKGROUND OF THE INVENTION

1. Field of the Invention

The present invention relates to multilayer substrates including insulator layers that are stacked.

2. Description of the Related Art

As an invention related to an existing multilayer substrate, for example, a laminated substrate described in Japanese Unexamined Patent Application Publication No. 2006-19643 has been known. The laminated substrate has a structure in which a plurality of dielectric layers are laminated in an up-down direction. A cavity for mounting an electronic component is provided on the upper surface of the laminated substrate.

In the laminated substrate described in Japanese Unexamined Patent Application Publication No. 2006-19643, the thickness in the up-down direction of the portion of the laminated substrate in which the cavity is provided is smaller than the thickness in the up-down direction of the portion of the laminated substrate in which the cavity is not provided. Therefore, the strength of the portion of the laminated substrate in which the cavity is provided is low. As a result, in a thermal pressure bonding process of the laminated substrate, the laminated substrate may be deformed, and the cavity may be deformed. In this case, a short circuit may occur between the conductors provided in the vicinity of the cavity.

SUMMARY OF THE INVENTION

Example embodiments of the present invention reduce or prevent short circuiting in a multilayer substrate in which a second multilayer body is fixed on a first multilayer body.

A multilayer substrate according to an example embodiment of the present invention includes a first multilayer body including a plurality of first insulator layers that are stacked in a Z-axis direction, a second multilayer body including a plurality of second insulator layers that are stacked in the Z-axis direction; and a plurality of first conductor layers in the first multilayer body. The second multilayer body is positioned in a positive direction of a Z-axis of the first multilayer body. The second multilayer body is fixed to the first multilayer body by bonding one of the plurality of first insulator layers to one of the plurality of second insulator layers. A first region in which the first multilayer body and the second multilayer body are provided when viewed in the Z-axis direction and a second region in which the first multilayer body is provided and the second multilayer body is not provided when viewed in the Z-axis direction are provided. Regions obtained by dividing the first multilayer body into three equal portions in the Z-axis direction are defined as a positive region, an intermediate region, and a negative region. The positive region, the intermediate region, and the negative region are arranged in this order toward a negative direction of the Z-axis. The plurality of first conductor layers include one or more positive region first conductor layers and one or more intermediate region first conductor layers. At least a portion of each of the one or more positive region first conductor layers is located in the positive region. An entirety or substantially an entirety of each of the one or more intermediate region first conductor layers is located in the intermediate region. A thickness in the Z-axis direction of at least one of the one or more positive region first conductor layers is larger than a thickness in the Z-axis direction of the one or more intermediate region first conductor layers.

According to example embodiments of the present invention, short circuiting is reduced or prevented in a multilayer substrate in which a second multilayer body is fixed on a first multilayer body.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Example embodiments of the present invention will be described in detail below with reference to the drawings.

Example Embodiment

Structure of Electronic Device

Figure 1:
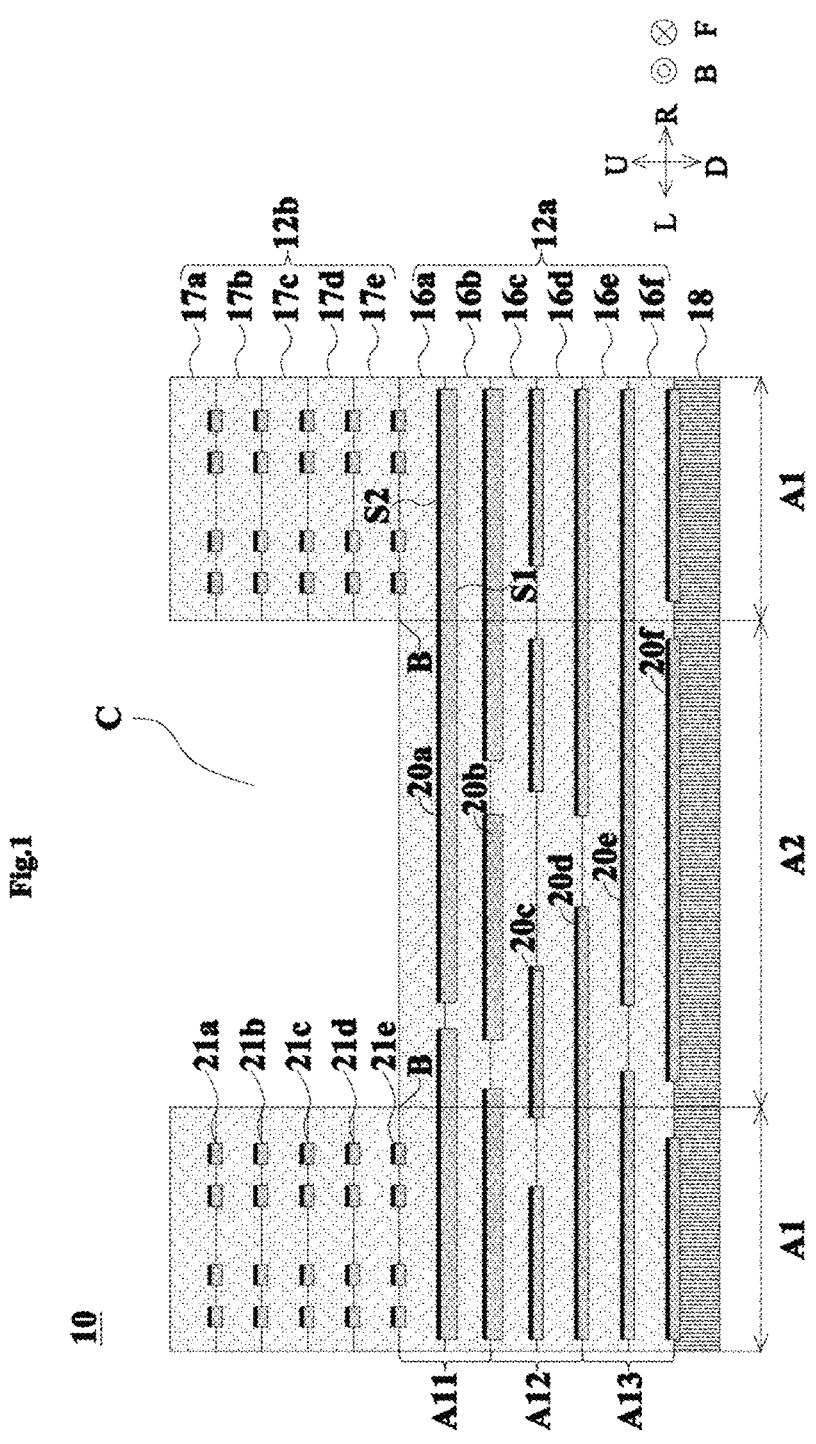
FIG. 1 is a cross-sectional view of a multilayer substrate 10 according to an example embodiment of the present invention.
Figure 2:
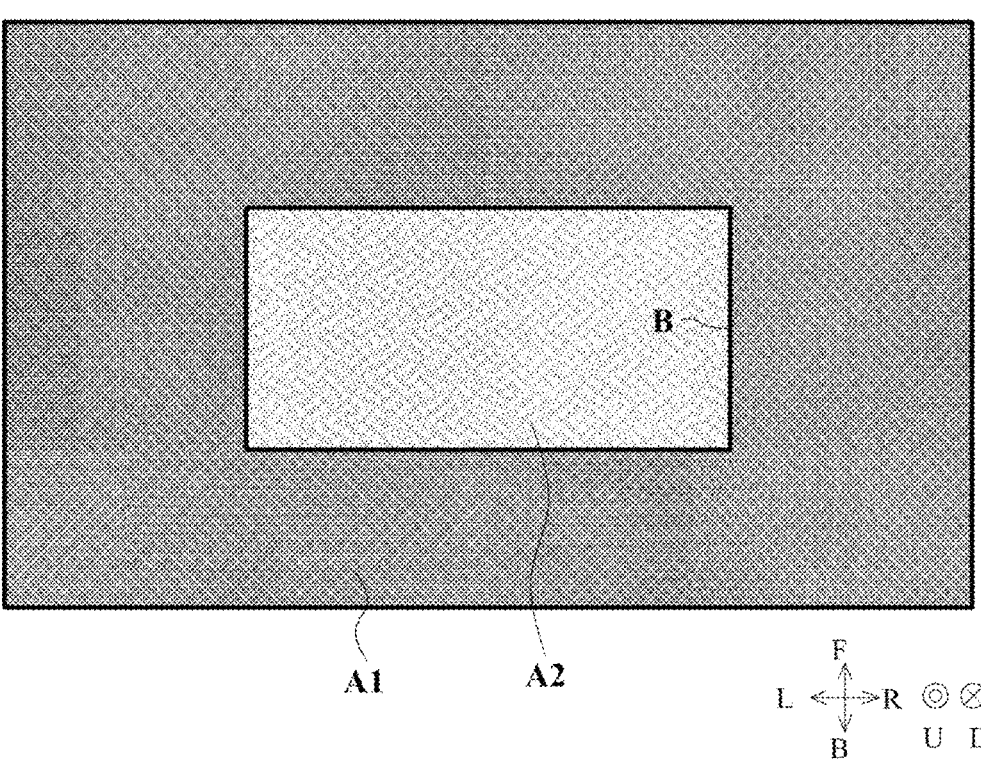
FIG. 2 is a top view of the multilayer substrate 10 according to an example embodiment of the present invention.

The structure of a multilayer substrate 10 according to an example embodiment of the present invention will be described below with reference to the drawings. FIG. 1 is a cross-sectional view of the multilayer substrate 10. FIG. 2 is a top view of the multilayer substrate 10.

In this specification, directions are defined as follows. A direction in which first insulator layers 16*a* to 16*f* are stacked is defined as an up-down direction. The up-down direction coincides with a Z-axis direction. Directions orthogonal or substantially orthogonal to the up-down direction are defined as a left-right direction and a front-back direction. The left-right direction and the front-back direction are orthogonal or substantially orthogonal to each other. The up-down direction, the front-back direction, and the left-right direction in the present example embodiment need not coincide with the up-down direction, the front-back direction, and the left-right direction when the multilayer substrate 10 is used.

Hereinafter, X is a component or a member of the multilayer substrate 10. In this specification, the respective portions of X are defined as follows, unless otherwise specified. The front portion of X means the front half of X. The rear portion of X means the rear half of X. The left portion of X means the left half of X. The right portion of X means the right half of X. The upper portion of X means the upper half of X. The lower portion of X means the lower half of X. The front end of X means the end in the front direction of X. The rear end of X means the end in the rear direction of X. The left end of X means the end in the left direction of X. The right end of X means the end in the right direction of X. The upper end of X means the end in the upward direction of X. The lower end of X means the end in the downward direction of X. The front end portion of X means the front end of X and the vicinity thereof. The rear end portion of X means the rear end of X and the vicinity thereof. The left end portion of X means the left end of X and the vicinity thereof. The right end portion of X means the right end of X and the vicinity thereof. The upper end portion of X means the upper end of X and the vicinity thereof. The lower end portion of X means the lower end of X and the vicinity thereof.

First, the structure of the multilayer substrate 10 will be described with reference to FIG. 1 and FIG. 2. The multilayer substrate 10 is used for a wireless communication terminal such as a smartphone, for example. As illustrated in FIG. 1, the multilayer substrate 10 includes a first multilayer body 12*a*, a second multilayer body 12*b*, a protection layer 18, first conductor layers 20*a* to 20*f*, and second conductor layers 21*a* to 21*e*.

As illustrated in FIG. 2, the first multilayer body 12*a* has a plate shape including an upper main surface and a lower main surface arranged in the up-down direction. As illustrated in FIG. 1, the first multilayer body 12*a* has a structure in which the first insulator layers 16*a* to 16*f* are stacked in the up-down direction (Z-axis direction). The first insulator layers 16*a* to 16*f* are arranged in this order from top to bottom. The first insulator layers 16*a* to 16*f* adjacent to each other in the up-down direction are fused to each other. The material of the first insulator layers 16*a* to 16*f* is, for example, a thermoplastic resin. The thermoplastic resin is, for example, a liquid crystal polymer.

The first conductor layers 20*a* to 20*f* are provided in the first multilayer body 12*a*. The first conductor layers 20*a* to 20*f* are arranged in this order from top to bottom. The first conductor layer 20*a* (the first conductor layer on the most positive side) is positioned at the top (in the positive direction of the Z-axis) among the conductor layers in the first multilayer body 12*a*. In the present example embodiment, each of the first conductor layers 20*a* to 20*f* is fixed to the lower main surface of each of the first insulator layers 16*a* to 16*f*. Thus, each of the first conductor layers 20*a* to 20*f* includes a first main surface S1 and a second main surface S2 having a larger surface roughness than that of the first main surface S1. The surface roughness is, for example, arithmetic surface roughness. In this specification, the main surface having a large surface roughness is indicated by a thick line. In the present example embodiment, the first main surface S1 is positioned below the second main surface S2. Each of the second main surfaces S2 of the first conductor layers 20*a* to 20*f* is in contact with the lower main surface of each of the first insulator layers 16*a* to 16*f*. Accordingly, the second main surface S2 of any of the first conductor layers 16*a* to 16*f* is in contact with all of the first insulator layers 20*a* to 20*f*. The first conductor layers 20*a* to 20*f* are respectively fixed to the first insulator layers 16*a* to 16*f* by an anchor effect.

The first conductor layers 20*a* to 20*f* are connected by interlayer connection conductors (not illustrated). Thus, the first conductor layers 20*a* to 20*f* define an electric circuit.

The first conductor layers 20*a* to 20*f* are formed by, for example, performing patterning on metal foils attached to the lower main surfaces of the first insulator layers 16*a* to 16*f*. The metal foil is, for example, a copper foil.

The protection layer 18 protects the first conductor layer 20*f* described below. The protection layer 18 covers the lower surface (the surface positioned in the negative direction of the Z-axis) of the first multilayer body 12*a*. However, the second main surface S2 of each of the first conductor layers 20*a* to 20*f* is not in contact with the protection layer 18. The material of the protection layer 18 is different from the material of the first insulator layers 16*a* to 16*f*. The protection layer 18 is not included in the first multilayer body 12*a*.

As illustrated in FIG. 2, the second multilayer body 12*b* has a plate shape including an upper main surface and a lower main surface arranged in the up-down direction. As illustrated in FIG. 1, the second multilayer body 12*b* has a structure in which second insulator layers 17*a* to 17*e* are stacked in the up-down direction (Z-axis direction). The second insulator layers 17*a* to 17*e* are arranged in this order from the top to the bottom. The second insulator layers 17*a* to 17*e* adjacent to each other in the up-down direction are fused to each other. The material of the second insulator layers 17a to 17e is, for example, a thermoplastic resin. The thermoplastic resin is, for example, a liquid crystal polymer.

The second multilayer body 12b is positioned on the first multilayer body 12a (in the positive direction of the Z-axis). The second multilayer body 12b is fixed to the first multilayer body 12a by bonding the first insulator layer 16a to the second insulator layer 17e. In the present example embodiment, the first insulator layer 16a and the second insulator layer 17e are fused.

The second multilayer body 12b has an annular shape when viewed in the up-down direction. In the present example embodiment, the second multilayer body 12b has a rectangular or substantially rectangular outer edge and a rectangular or substantially rectangular inner edge when viewed in the up-down direction. The second multilayer body 12b overlaps a portion of the first multilayer body 12a when viewed in the up-down direction. As such, a first region A1 in which the first multilayer body 12a and the second multilayer body 12b are present when viewed in the up-down direction (the Z-axis direction), and a second region A2 in which the first multilayer body 12a is present and the second multilayer body 12b is not present when viewed in the up-down direction (the Z-axis direction) are provided. The second region A2 is surrounded by the first region A1 when viewed in the up-down direction. Thus, a cavity C is provided in the multilayer substrate 10.

The second conductor layers 21a to 21e are provided in the second multilayer body 12b. In the present example embodiment, each of the second conductor layers 21a to 21e is fixed to the lower main surface of each of the second insulator layers 17a to 17e. The second conductor layers 21a to 21e are electrically connected to each other by interlayer connection conductors (not illustrated). Thus, the second conductor layers 21a to 21e define, for example, one or more coils. In this case, the second conductor layers 21a to 21e located in the left first region A1 define one coil. The second conductor layers 21a to 21e located in the right first region A1 define one coil. In addition, the second conductor layers 21a to 21e are electrically connected to at least one of the first conductor layers 20a to 20f by interlayer connection conductors (not illustrated).

The second conductor layers 21a to 21e are formed by, for example, performing patterning on metal foils attached to the lower main surfaces of the second insulator layers 17a to 17e. The metal foil is, for example, a copper foil.

Regions obtained by dividing the first multilayer body 12a into three equal or substantially equal portions in the up-down direction (the Z-axis direction) are defined as a positive region A11, an intermediate region A12, and a negative region A13. The positive region A11, the intermediate region A12, and the negative region A13 are arranged in this order in the downward direction (negative direction of the Z-axis).

The first conductor layers 20a to 20f include one or more positive region first conductor layers, one or more intermediate region first conductor layers, and one or more negative region first conductor layers. In the present example embodiment, the one or more positive region first conductor layers are the first conductor layers 20a and 20b. The one or more intermediate region first conductor layers are the first conductor layer 20c. The one or more negative region first conductor layers are the first conductor layers 20d to 20f.

At least a portion of each of the first conductor layers 20a and 20b (one or more positive region first conductor layers) is located in the positive region A11. In the present example embodiment, the entire or substantially the entire first conductor layer 20a is located in the positive region A11. A portion of the first conductor layer 20b is located in the positive region A11. In addition, at least one of the first conductor layers 20a and 20b (one or more positive region first conductor layers) overlaps a boundary B between the first region A1 and the second region A2 when viewed in the up-down direction (the Z-axis direction). In the present example embodiment, the first conductor layers 20a and 20b overlap the boundary B between the first region A1 and the second region A2 when viewed in the up-down direction.

The entire or substantially the entire first conductor layer 20c (intermediate region first conductor layer) is located in the intermediate region A12.

At least a portion of each of the first conductor layers 20d to 20f (one or more negative region first conductor layers) is located in the negative region A13. In the present example embodiment, the entire or substantially the entire first conductor layer 20e is located in the negative region A13. Portions of the first conductor layers 20d and 20f are located in the negative region A13.

The thickness in the up-down direction (the Z-axis direction) of the first conductor layer 20a (the first conductor layer on the most positive side, the one or more positive region first conductor layers) and the first conductor layer 20b (the one or more positive region first conductor layers) is larger than the thickness in the up-down direction (the Z-axis direction) of the first conductor layer 20c (the one or more intermediate region first conductor layers). In this specification, the thickness of the conductor layer in the up-down direction means the thickness in the normal direction of the main surface of the conductor layer. Therefore, when the conductor layer is curved, the up-down direction is deviated from the up-down direction in the drawings. The thickness of the first conductor layers 20d to 20f in the up-down direction is the same or substantially the same as the thickness of the first conductor layer 20c in the up-down direction. In this specification, the phrase "the thickness of the first conductor layers 20a and 20b in the up-down direction is larger than the thickness of the first conductor layer 20c in the up-down direction" does not include the case where the thickness of the first conductor layers 20a and 20b in the up-down direction is larger than the thickness of the first conductor layer 20c in the up-down direction due to the manufacturing error. The manufacturing error is, for example, about 10% of the thickness of the first conductor layer 20c in the up-down direction.

Advantageous Effects

According to the multilayer substrate 10, in the multilayer substrate 10 in which the second multilayer body 12a is fixed on the first multilayer body 12b, it is possible to reduce or prevent the occurrence of a short circuit. More specifically, the thickness of the portion of the multilayer substrate 10 in the up-down direction in which the cavity C is provided is smaller than the thickness of the portion of the multilayer substrate 10 in the up-down direction in which the cavity C is not provided. Therefore, the strength of the portion of the multilayer substrate 10 in which the cavity C is provided is likely to be low.

Thus, at least a portion of each of the first conductor layers 20a and 20b is located in the positive region A11. The thickness of the first conductor layers 20a and 20b in the up-down direction is larger than the thickness of the first conductor layer 20c in the up-down direction. Accordingly, the first conductor layers 20a and 20b having high strength are positioned near the upper main surface of the first multilayer body 12a. That is, the first conductor layers 20a and 20b having high strength are positioned near the bottom surface of the cavity C. As a result, in a thermal pressure bonding process of the first multilayer body 12a and the second multilayer body 12b, the vicinity of the bottom surface of the cavity C is less likely to be deformed, and the cavity C is less likely to be deformed. Therefore, the occurrence of a short circuit between the first conductor layers 20a to 20f provided in the vicinity of the cavity C is reduced or prevented.

In the multilayer substrate 10, the occurrence of large deformation in the multilayer substrate 10 is reduced or prevented in the thermal pressure bonding process of the first multilayer body 12a and the second multilayer body 12b. More specifically, in the thermal pressure bonding process of the first multilayer body 12a and the second multilayer body 12b, large forces concentrate on the boundary B between the first region A1 and the second region A2. Therefore, the multilayer substrate 10 is likely to be largely deformed at the boundary B.

Thus, the first conductor layers 20a and 20b overlap the boundary B between the first region A1 and the second region A2 when viewed in the up-down direction. Since the thickness of the first conductor layers 20a and 20b in the up-down direction is larger than the thickness of the first conductor layer 20c in the up-down direction, the first conductor layers 20a and 20b have high strength. As a result, the occurrence of large deformation at the boundary B in the multilayer substrate 10 is reduced or prevented.

First Modification to Fourth Modification

Hereinafter, multilayer substrates 10a to 10d according to first to fourth modifications of example embodiments of the present invention will be described with reference to the drawings. FIG. 3 to FIG. 6 are top views of the multilayer substrates 10a to 10d.

Figure 3:
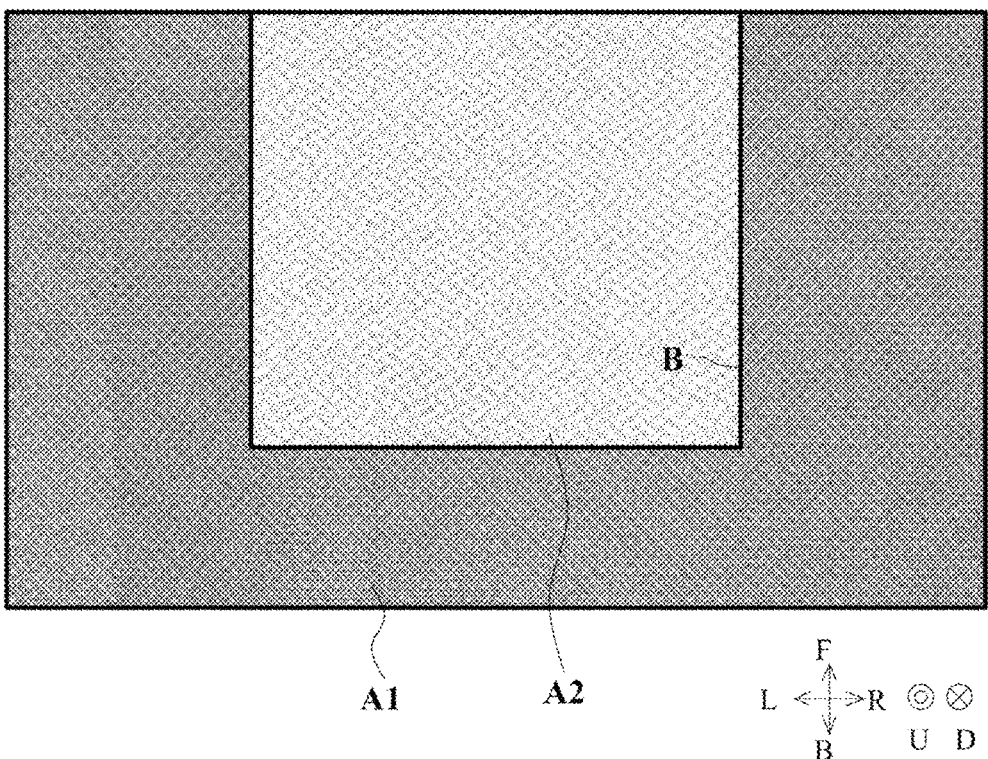
FIG. 3 is a top view of a multilayer substrate 10a according to an example embodiment of the present invention.

In the multilayer substrate 10a, as illustrated in FIG. 3, the second multilayer body 12b has an angular U-shape when viewed in the up-down direction. Thus, the first region A1 is located in a portion of the periphery of the second region A2 when viewed in the up-down direction. The first region A1 is not located in front of the second region A2.

Figure 4:
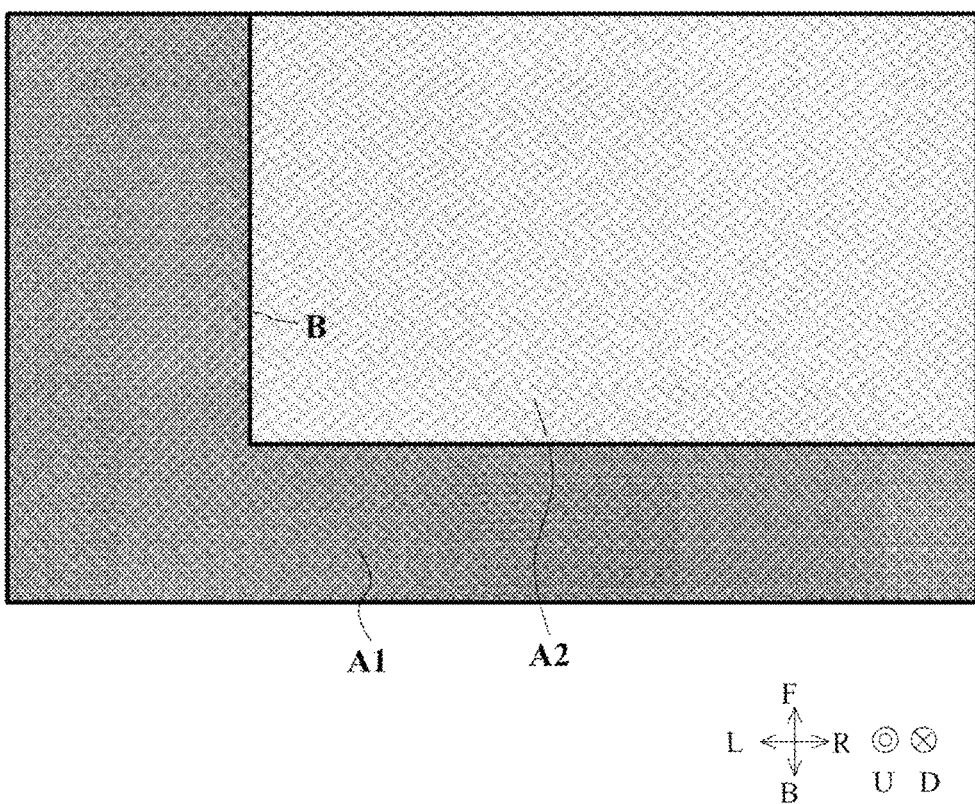
FIG. 4 is a top view of a multilayer substrate 10b according to an example embodiment of the present invention.

In the multilayer substrate 10b, as illustrated in FIG. 4, the second multilayer body 12b has an L shape when viewed in the up-down direction. Thus, the first region A1 is located in a portion of the periphery of the second region A2 when viewed in the up-down direction. The first region A1 is not located in front of or to the right of the second region A2.

Figure 5:
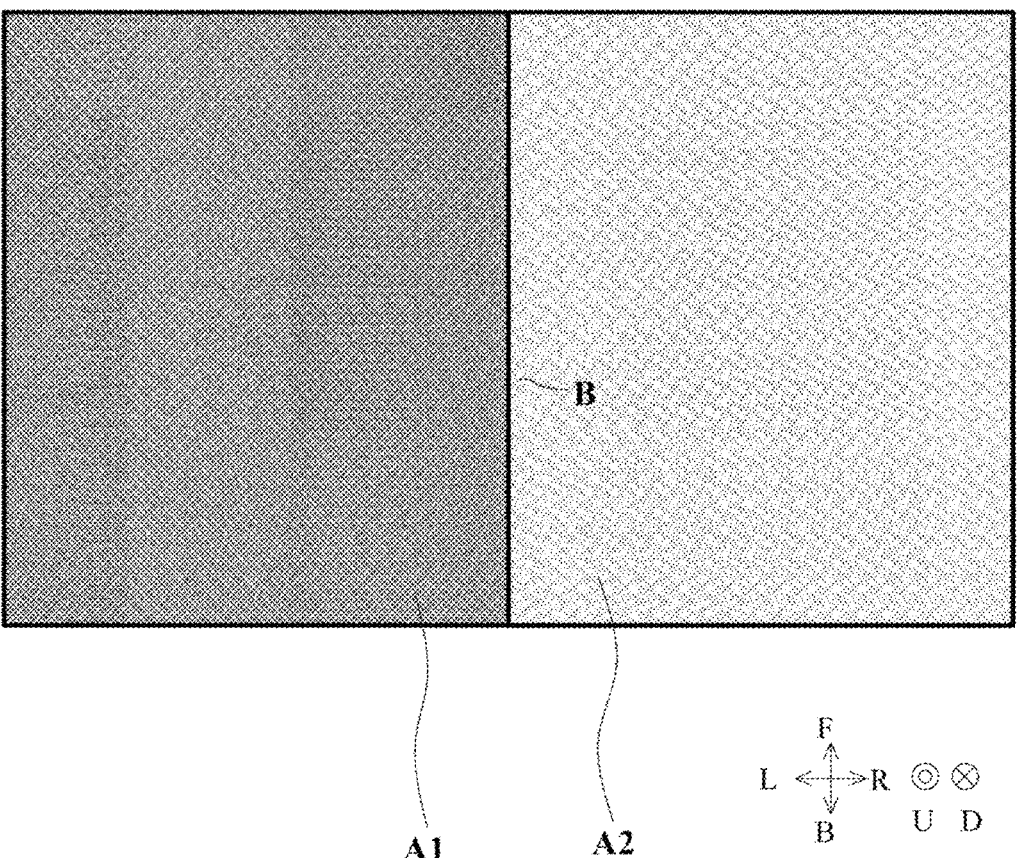
FIG. 5 is a top view of a multilayer substrate 10c according to an example embodiment of the present invention.

In the multilayer substrate 10c, as illustrated in FIG. 5, the first region A1 and the second region A2 are arranged side by side when viewed in the up-down direction.

Figure 6:
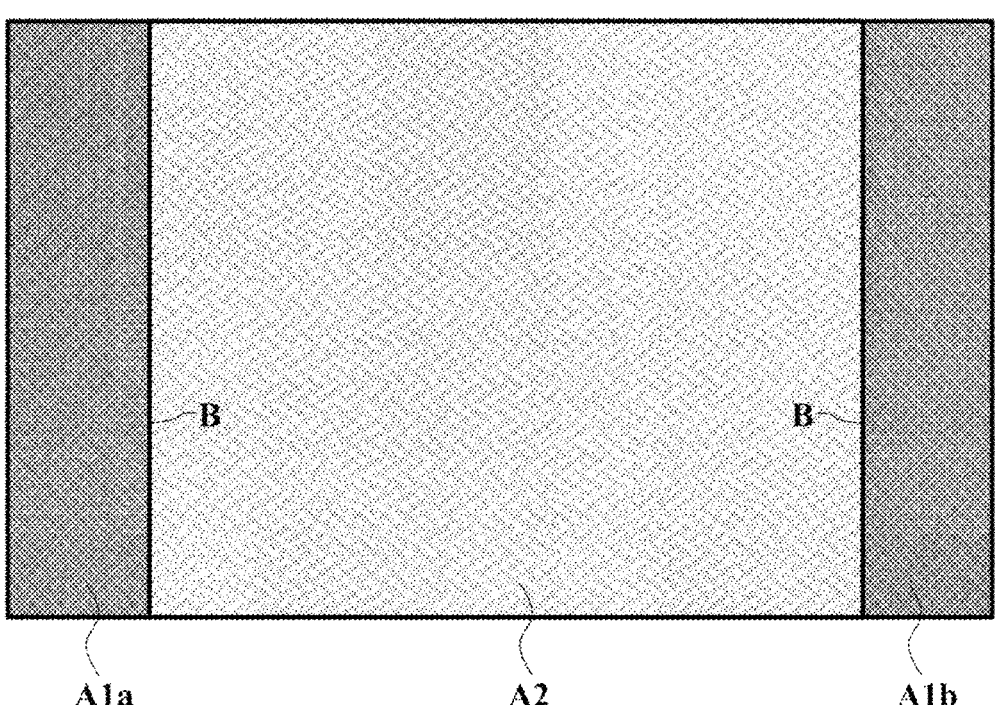
FIG. 6 is a top view of a multilayer substrate 10d according to an example embodiment of the present invention.

As illustrated in FIG. 6, the multilayer substrate 10d includes two first regions A1a and A1b when viewed in the up-down direction. The second region A2 is located between the first region A1a and the first region A1b when viewed in the up-down direction.

Fifth Modification

Figure 7:
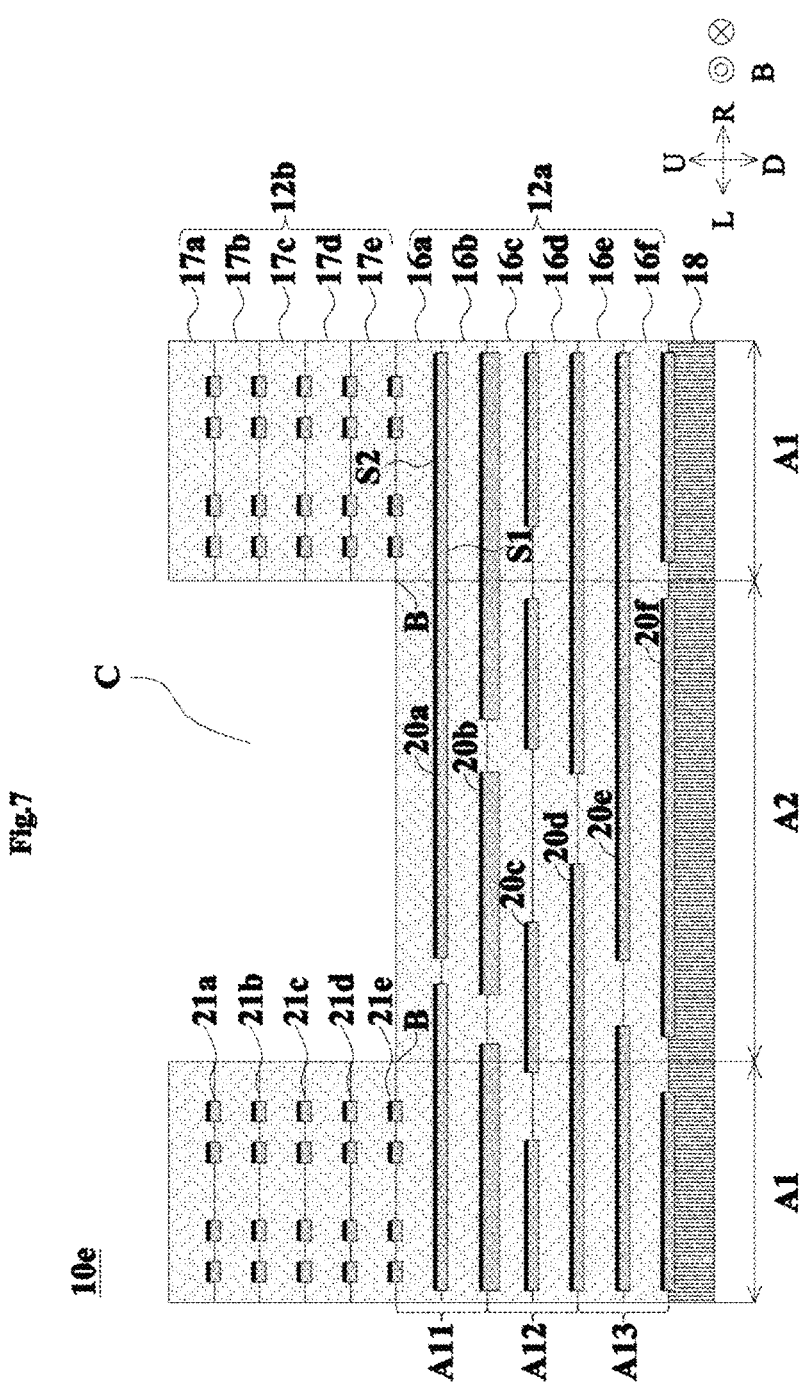
FIG. 7 is a cross-sectional view of a multilayer substrate 10e according to an example embodiment of the present invention.

Hereinafter, a multilayer substrate 10e according to a fifth modification of an example embodiment of the present invention will be described with reference to the drawings. FIG. 7 is a cross-sectional view of the multilayer substrate 10e.

The multilayer substrate 10e is different from the multilayer substrate 10 in that the thickness of the first conductor layer 20a in the up-down direction is smaller than the thickness of the first conductor layer 20b in the up-down direction. The thickness of first conductor layer 20a in the up-down direction is equal or substantially equal to the thickness of the first conductor layers 20c to 20f in the up-down direction. The other structures of the multilayer substrate 10e are the same or substantially the same as those of the multilayer substrate 10. The multilayer substrate 10e can achieve the same advantageous effects as the multilayer substrate 10.

In addition, according to the multilayer substrate 10e, the thickness of the first conductor layer 20b positioned below the first conductor layer 20a, the first conductor layers 20a and 20b being located in the positive region A11, is large in the up-down direction. As such, the deformation of the first multilayer body 12a in the intermediate region A12 and the negative region A13 of the first multilayer body 12a is reduced or prevented. In addition, since the deformation of the first multilayer body 12a is reduced or prevented in the vicinity of the first conductor layer 20b, a short circuit is unlikely to occur in the first conductor layer 20a positioned above the first conductor layer 20b.

Sixth Modification

Figure 8:
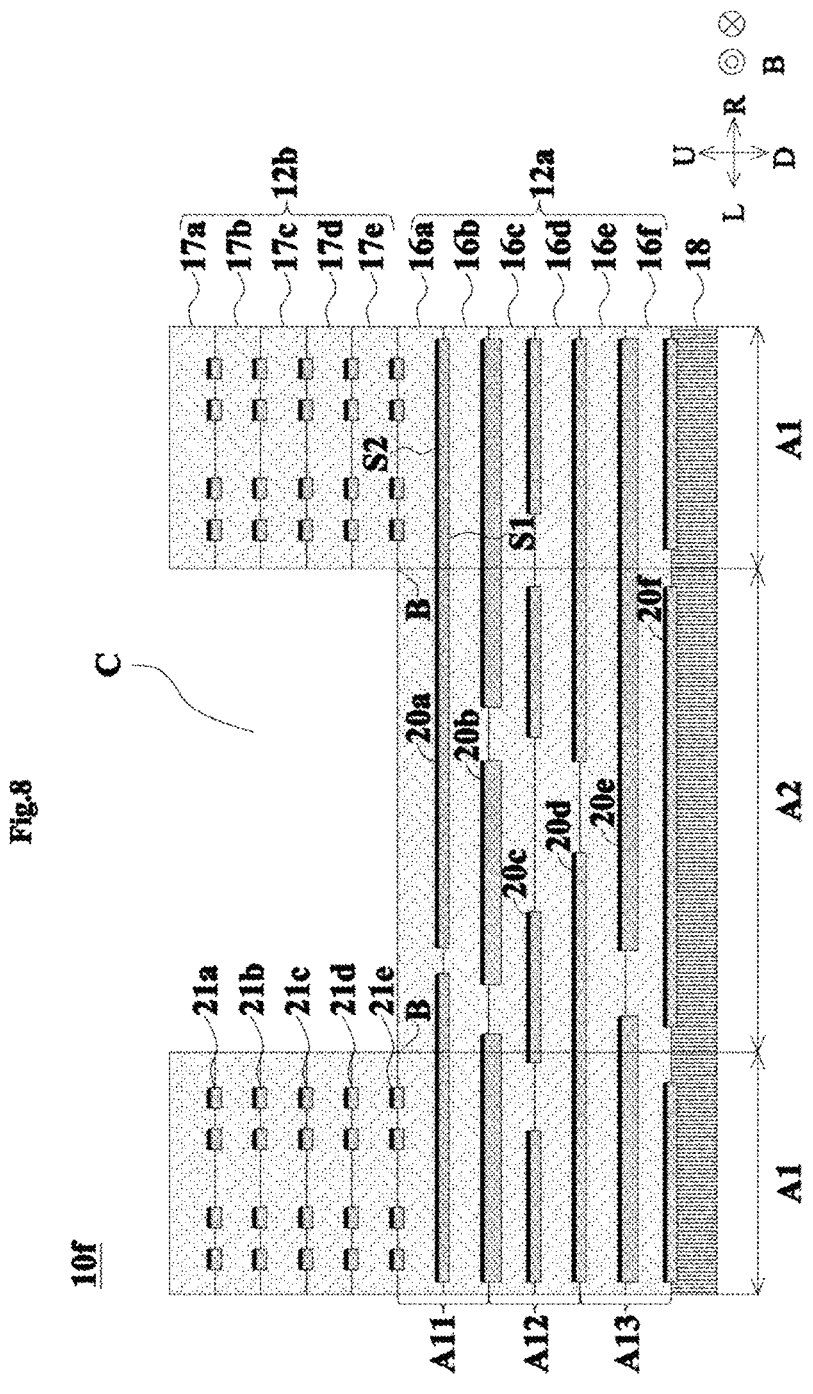
FIG. 8 is a cross-sectional view of a multilayer substrate 10f according to an example embodiment of the present invention.

A multilayer substrate 10f according to a sixth modification of an example embodiment of the present invention will be described below with reference to the drawings. FIG. 8 is a cross-sectional view of the multilayer substrate 10f.

The multilayer substrate 10f is different from the multilayer substrate 10e in that the thickness in the up-down direction of the first conductor layer 20e located in the negative region A13 is larger than the thickness in the up-down direction of the first conductor layer 20c located in the intermediate region A12. Thus, the other structures of the multilayer substrate 10f are the same or substantially the same as those of the multilayer substrate 10e, and thus the description thereof is omitted. The multilayer substrate 10f can achieve the same advantageous effects as the multilayer substrate 10e.

In addition, according to the multilayer substrate 10f, the thickness in the up-down direction of the first conductor layer 20e located in the negative region A13 is large. As such, the deformation of the first multilayer body 12a in the negative region A13 of the first multilayer body 12a is reduced or prevented.

In the multilayer substrate 10f, the thickness of the first conductor layers 20b and 20e in the up-down direction is larger than the thickness of the first conductor layer 20c in the up-down direction. Thus, the first region A1 has a vertically symmetrical structure, and thus warpage is less likely to occur in the first multilayer body 12a.

Seventh Modification

Figure 9:
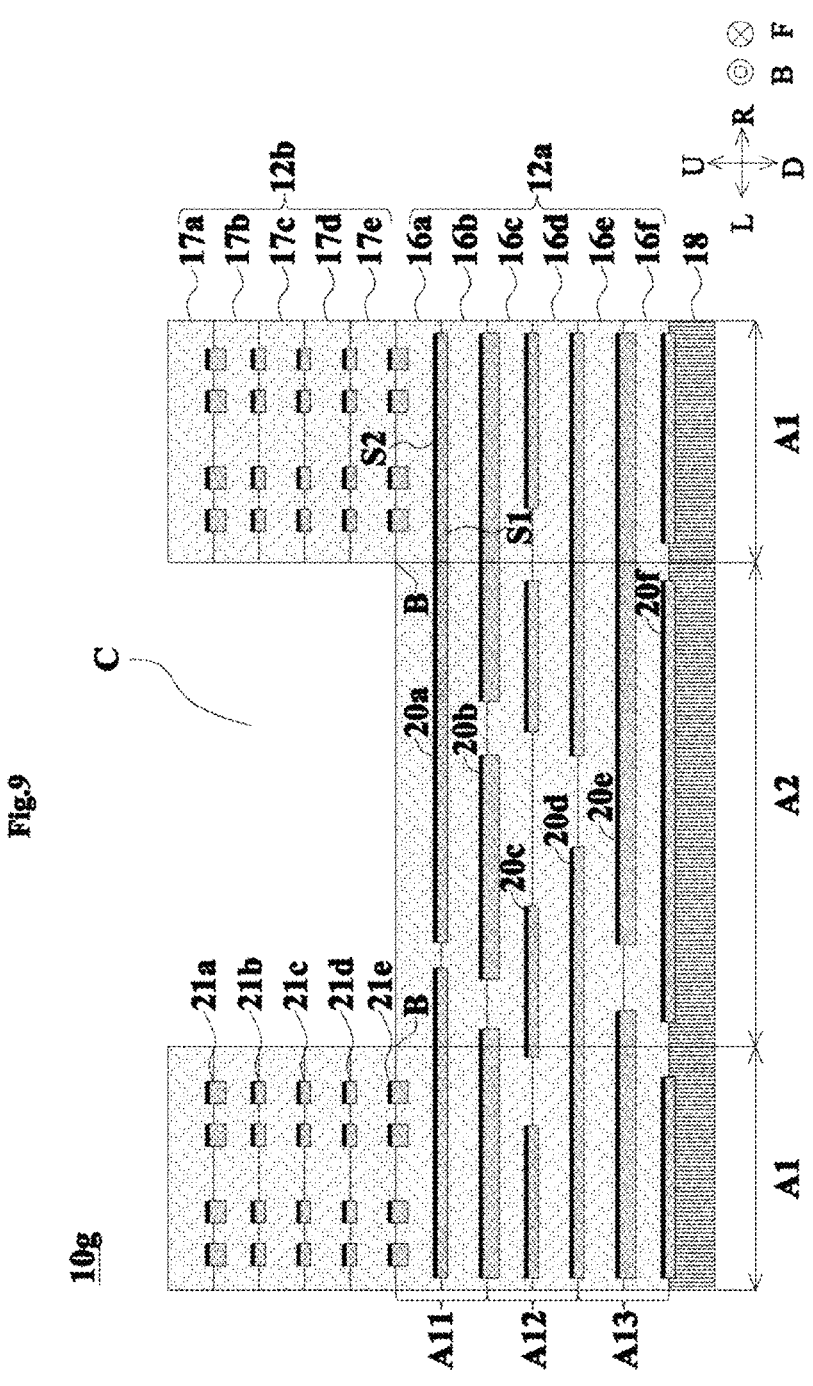
FIG. 9 is a cross-sectional view of a multilayer substrate 10g according to an example embodiment of the present invention.

A multilayer substrate 10g according to a seventh modification of an example embodiment of the present invention will be described below with reference to the drawings. FIG. 9 is a cross-sectional view of the multilayer substrate 10g.

The multilayer substrate 10g is different from the multilayer substrate 10f in that the thickness in the up-down direction (Z-axis direction) of the second conductor layers 21a and 21e located at both ends in the up-down direction (Z-axis direction) of the second conductor layers 21a to 21e is larger than the thickness in the up-down direction (Z-axis direction) of the remaining second conductor layers 21b to 21d. As such, the second multilayer body 12b is less likely to be deformed. The other structures of the multilayer substrate 10*g* are the same or substantially the same as those of the multilayer substrate 10*f*, and thus the description thereof will be omitted. The multilayer substrate 10*g* can achieve the same advantageous effects as the multilayer substrate 10*f*.

In the multilayer substrate 10*g*, the thickness of the first conductor layers 20*b* and 20*e* in the up-down direction is larger than the thickness of the first conductor layer 20*c* in the up-down direction. Thus, the first region A1 has a vertically symmetrical structure, and thus warpage is less likely to occur in the first multilayer body 12*a*.

Eighth Modification

Figure 10:
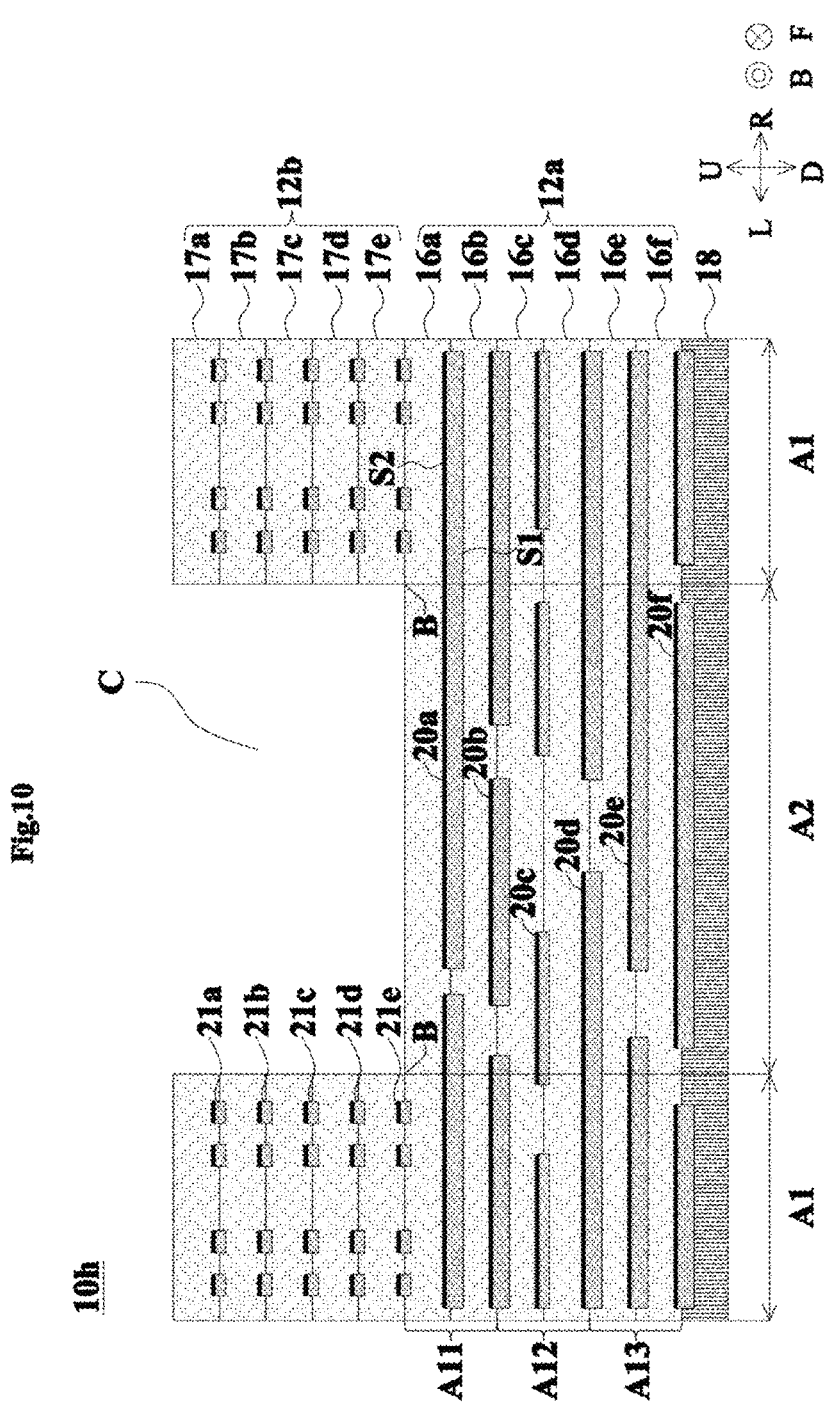
FIG. 10 is a cross-sectional view of a multilayer substrate 10h according to an example embodiment of the present invention.

A multilayer substrate 10*h* according to an eighth modification of an example embodiment of the present invention will be described below with reference to the drawings. FIG. 10 is a cross-sectional view of the multilayer substrate 10*h*.

The multilayer substrate 10*h* is different from the multilayer substrate 10*f* in that the thickness in the up-down direction of the first conductor layers 20*a* and 20*b* located in the positive region A11 and the first conductor layers 20*d* to 20*f* located in the negative region A13 is larger than the thickness in the up-down direction of the first conductor layer 20*c* located in the intermediate region A12. As such, the first multilayer body 12*a* is less likely to be deformed. The other structures of the multilayer substrate 10*h* are the same or substantially the same as those of the multilayer substrate 10*f*, and thus the description thereof will be omitted. The multilayer substrate 10*h* can achieve the same advantageous effects as the multilayer substrate 10*f*.

Ninth Modification

Figure 11:
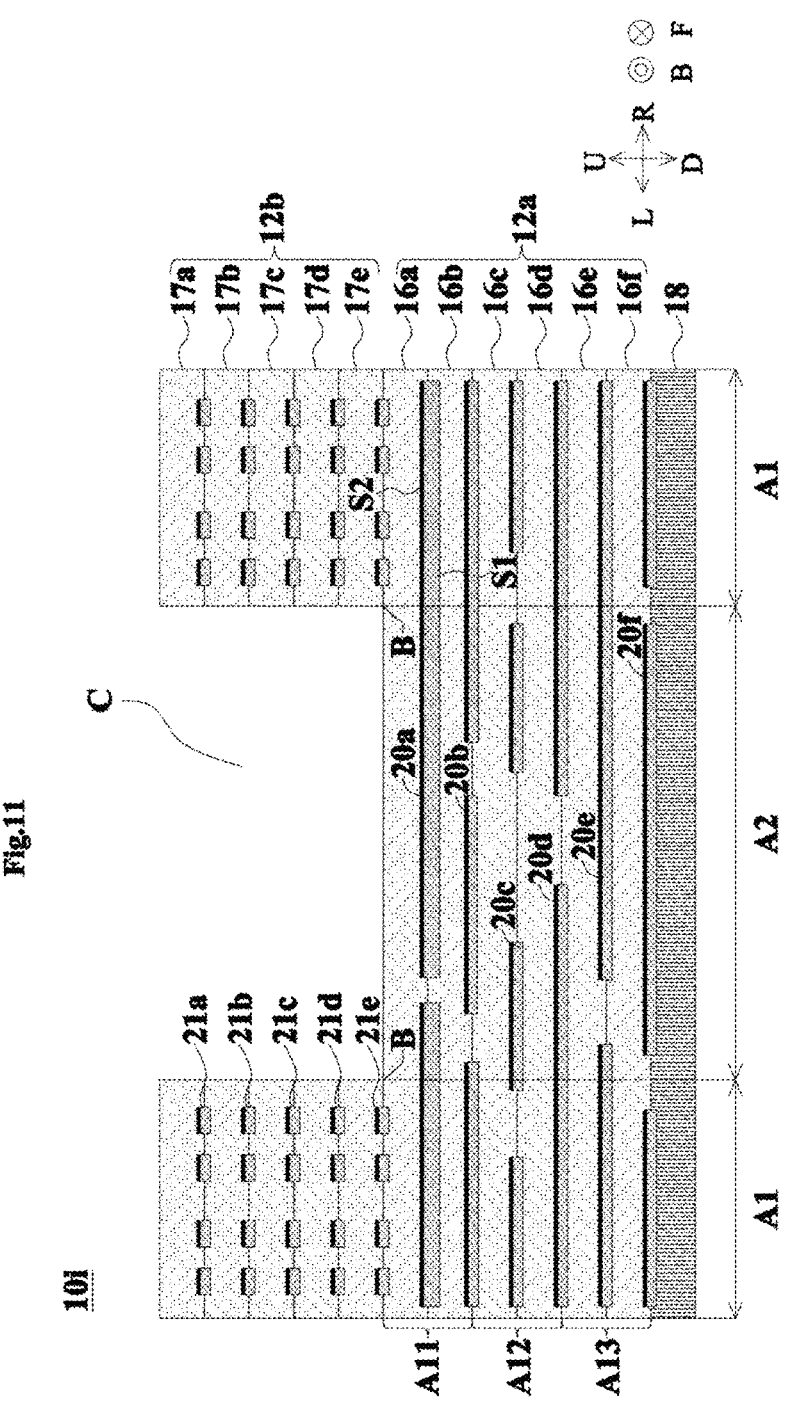
FIG. 11 is a cross-sectional view of a multilayer substrate 10i according to an example embodiment of the present invention.

A multilayer substrate 10*i* according to a ninth modification of an example embodiment of the present invention will be described below with reference to the drawings. FIG. 11 is a cross-sectional view of the multilayer substrate 10*i*.

The multilayer substrate 10*i* is different from the multilayer substrate 10 in that the thickness in the up-down direction of the first conductor layer 20*a* is larger than the thickness in the up-down direction of the first conductor layers 20*b* to 20*f*. As such, the vicinity of the upper main surface of the first conductor layer 20*a* is less likely to be deformed. As a result, the deformation of the cavity C is effectively reduced or prevented. The other structures of the multilayer substrate 10*i* are the same or substantially the same as those of the multilayer substrate 10, and thus the description thereof is omitted. The multilayer substrate 10*i* can achieve the same advantageous effects as the multilayer substrate 10.

Tenth Modification

Figure 12:
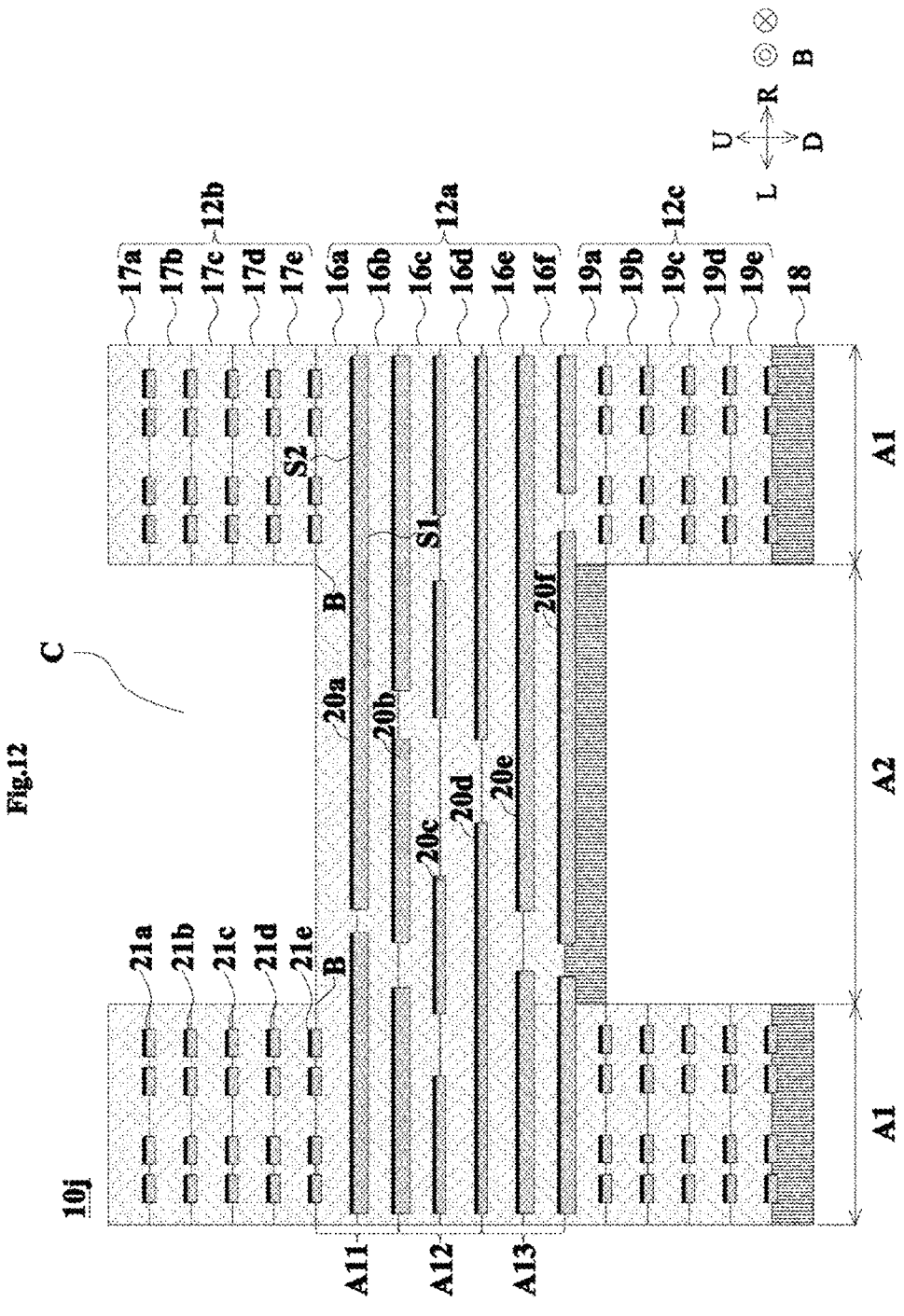
FIG. 12 is a cross-sectional view of a multilayer substrate 10j according to an example embodiment of the present invention.

A multilayer substrate 10*j* according to a tenth modification of an example embodiment of the present invention will be described below with reference to the drawings. FIG. 12 is a cross-sectional view of the multilayer substrate 10*j*.

The multilayer substrate 10*j* is different from the multilayer substrate 10 in that the multilayer substrate 10*j* further includes a third multilayer body 12*c*. The third multilayer body 12*c* has the same or substantially the same structure as the second multilayer body 12*b*. The third multilayer body 12*c* is positioned below the first multilayer body 12*a* (in the negative direction of the Z-axis). The third multilayer body 12*c* is fixed to the first multilayer body 12*a* by bonding the first insulator layer 16*f* to a third insulator layer 19*a*. In the present example embodiment, the first insulator layer 16*f* and the third insulator layer 19*a* are fused. The other structures of the multilayer substrate 10*j* are the same or substantially the same as those of the multilayer substrate 10, and thus the description thereof is omitted. The multilayer substrate 10*j* can achieve the same advantageous effects as the multilayer substrate 10.

Eleventh Modification

Figure 13:
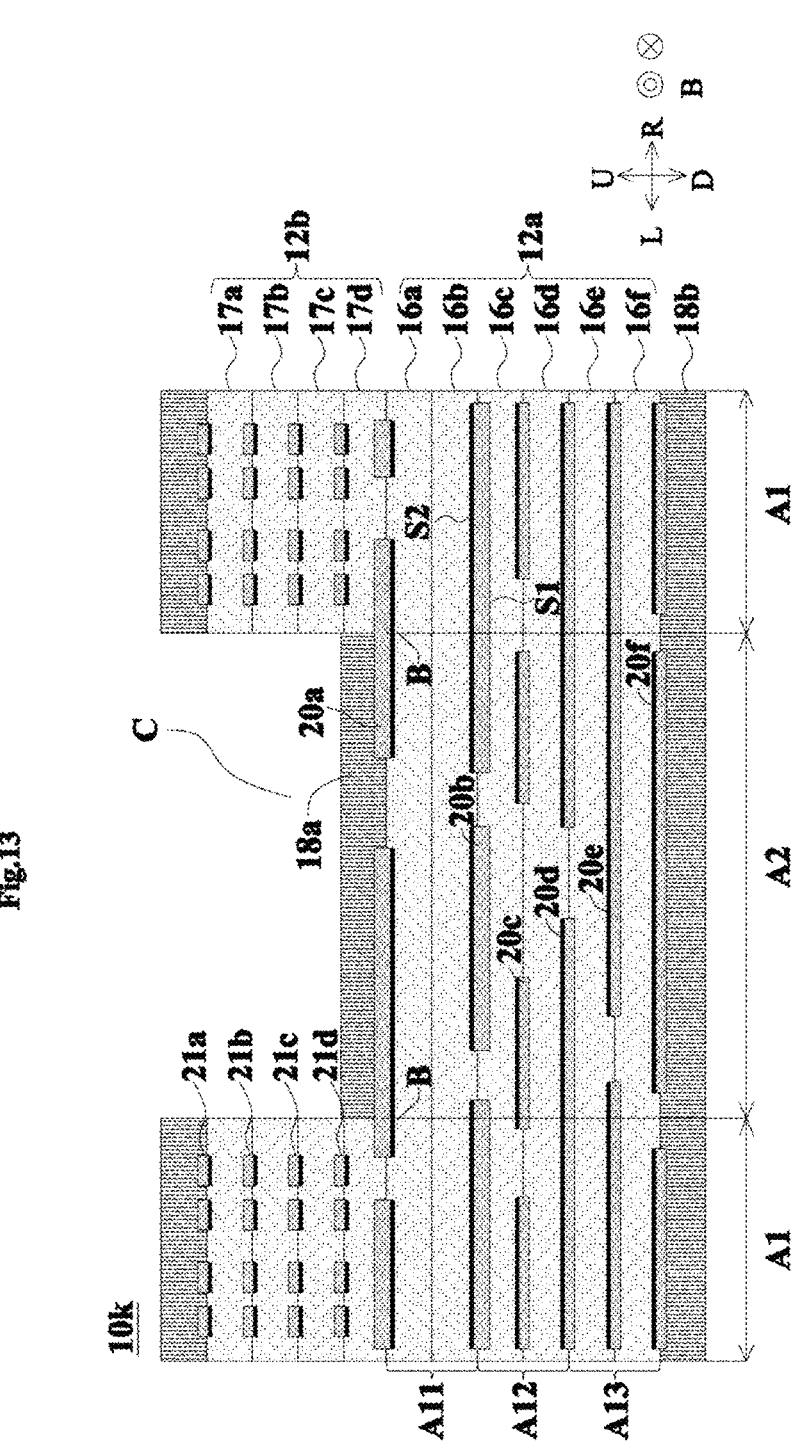
FIG. 13 is a cross-sectional view of a multilayer substrate 10k according to an example embodiment of the present invention.

A multilayer substrate 10*k* according to an eleventh modification of an example embodiment of the present invention will be described below with reference to the drawings. FIG. 13 is a cross-sectional view of the multilayer substrate 10*k*.

The multilayer substrate 10*k* is different from the multilayer substrate 10 in the following points.

The first conductor layer 20*a* is located on the upper main surface (main surface positioned in the positive direction of the Z-axis) of the first insulator layer 16*a* located at the uppermost position (in the positive direction of the Z-axis) of the first insulator layers 16*a* to 16*f*.

The first conductor layer 20*f* is located on the lower main surface (main surface positioned in the negative direction of the Z-axis) of the first insulator layer 16*f* located at the lowermost position (in the negative direction of the Z-axis) of the first insulator layers 16*a* to 16*f*.

More specifically, the first conductor layer 20*a* is fixed to the upper main surface of the first insulator layer 16*a*. The first conductor layer 20*f* is fixed to the lower main surface of the first insulator layer 16*f*. A protection layer 18*a* is stacked on the first insulator layer 16*a*. A protection layer 18*b* is stacked under the first insulator layer 16*f*. However, no conductor layer is located on the upper main surface of the protection layer 18*a* and the lower main surface of the protection layer 18*b*. The other structures of the multilayer substrate 10*k* are the same or substantially the same as those of the multilayer substrate 10. The multilayer substrate 10*k* can achieve the same advantageous effects as the multilayer substrate 10.

Twelfth Modification

Figure 14:
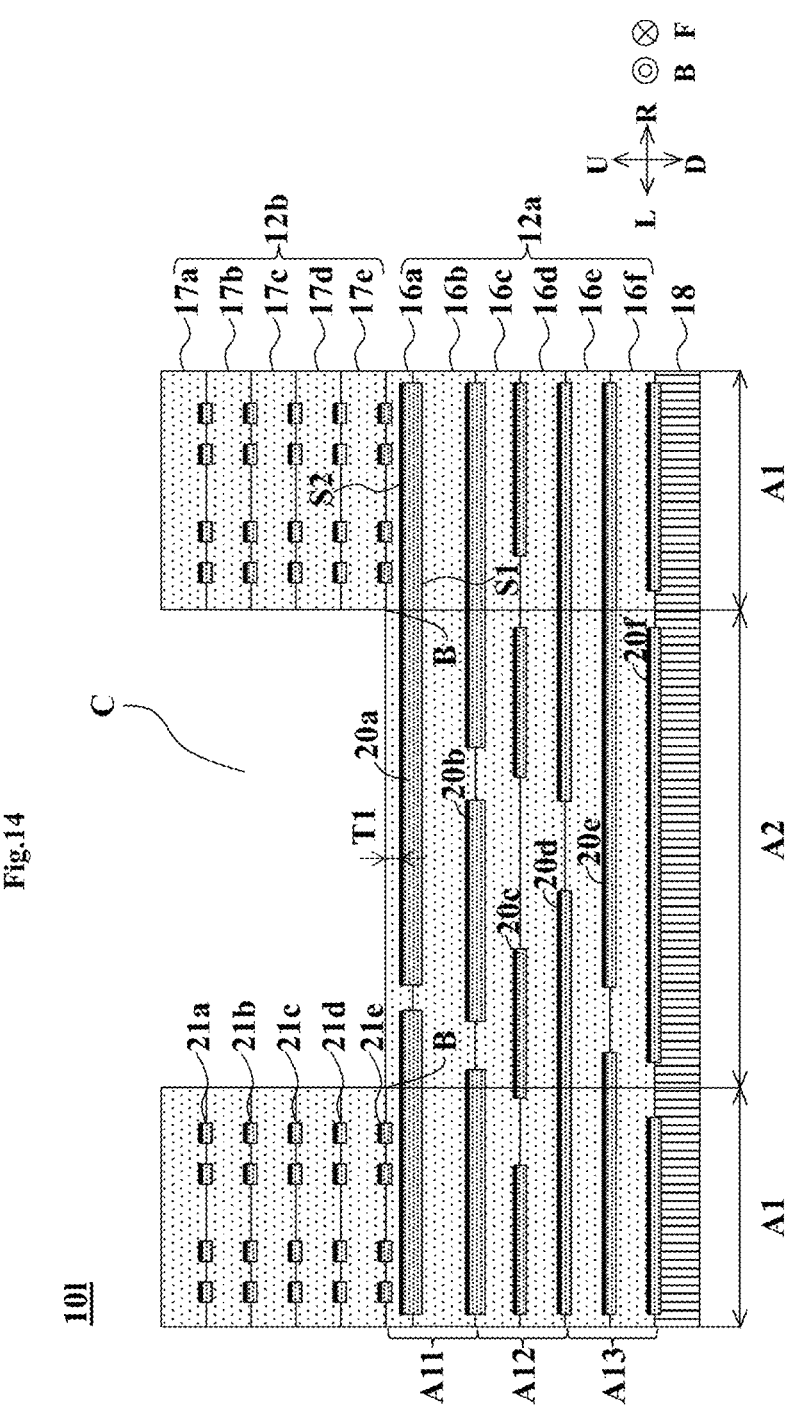
FIG. 14 is a cross-sectional view of a multilayer substrate 10*l* according to an example embodiment of the present invention.

A multilayer substrate 10*l* according to a twelfth modification of an example embodiment of the present invention will be described below with reference to the drawings. FIG. 14 is a cross-sectional view of the multilayer substrate 10*l*.

The multilayer substrate 10*l* is different from the multilayer substrate 10 in that a thickness Tl in the up-down direction of the portion of the first insulator layer 16*a* (the first insulator layer on the most positive side) in contact with the first conductor layer 20*a* (the negative-side adjacent first conductor layer) is smaller than the thickness in the up-down direction of the first conductor layer 20*a*.

More specifically, the first insulator layer 16*a* is located at the uppermost position among the insulator layers in the first multilayer body 12*a*. That is, the first insulator layer 16*a* is bonded to the second insulator layer 17*e* of the second multilayer body 12*b* and defines the bottom surface of the cavity C. The first conductor layer 20*a* is in contact with the lower main surface of the first insulator layer 16*a* and is located directly below the first insulator layer 16*a*. The first insulator layers 16*a* and 16*b* are provided such that the thickness Tl in the up-down direction of the portion of the first insulator layer 16*a* in contact with the first conductor layer 20*a* is smaller than the thickness in the up-down direction of the first conductor layer 20*a*. This increases the rigidity of the vicinity of the bottom surface of the cavity C. As a result, the effect of reducing or preventing deformation of the cavity C is improved when stress is applied to the multilayer substrate 10*l*, when the first multilayer body 12*a* and the second multilayer body 12*b* are thermal-pressure bonded, and the like. The other structures of the multilayer substrate 10*l* are the same or substantially the same as those of the multilayer substrate 10, and thus the description thereof is omitted. The multilayer substrate 10*l* can achieve the same advantageous effects as the multilayer substrate 10.

Thirteenth Modification

Figure 15:
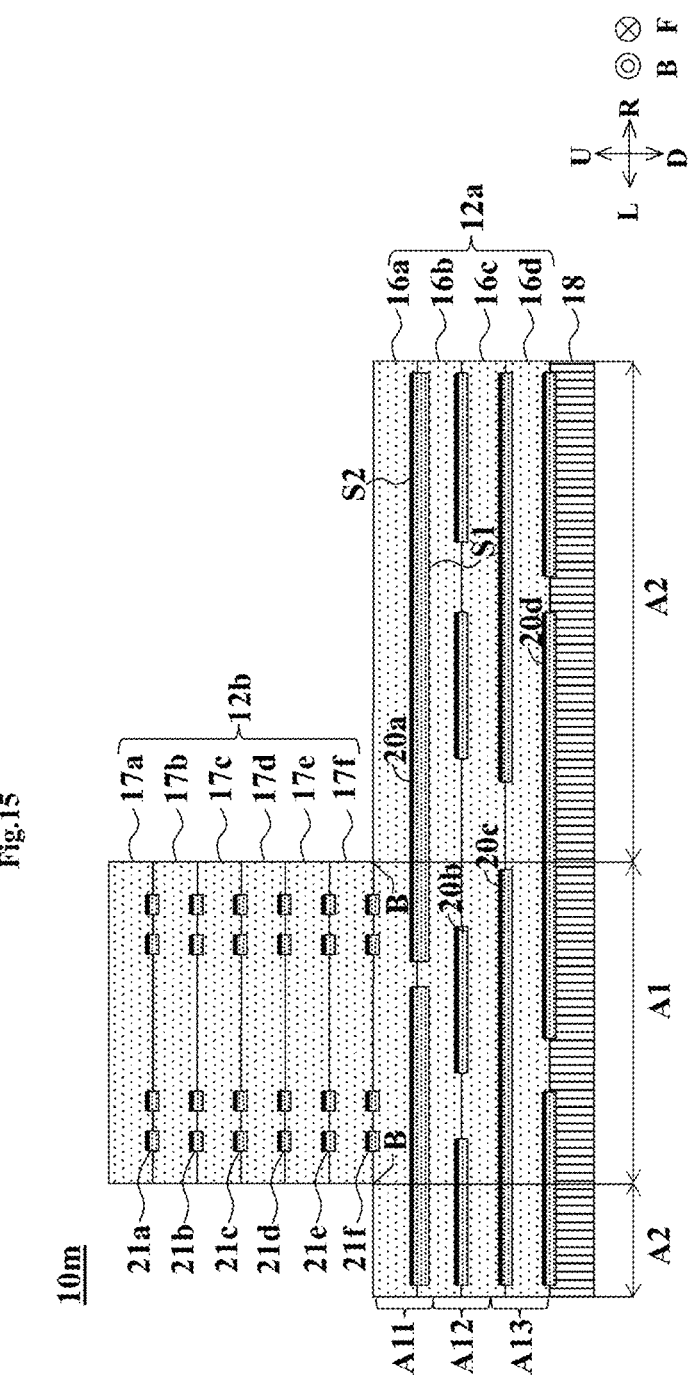
FIG. 15 is a cross-sectional view of a multilayer substrate 10*m* according to an example embodiment of the present invention.
Figure 16:
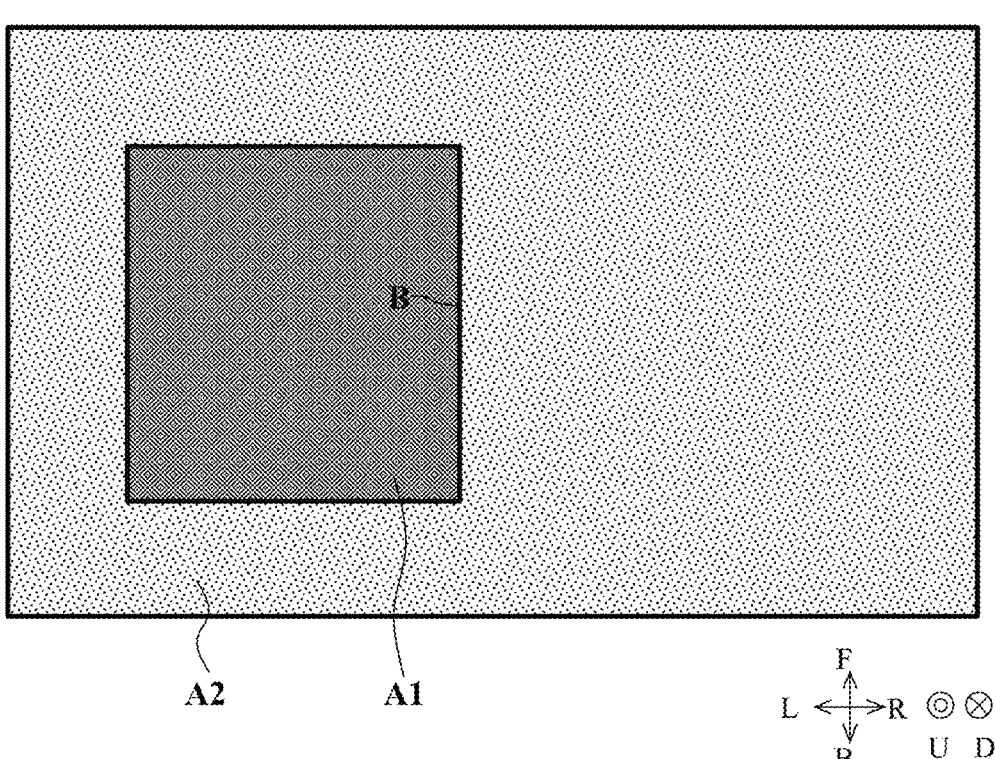
FIG. 16 is a top view of a multilayer substrate 10*m* according to an example embodiment of the present invention.

A multilayer substrate 10*m* according to a thirteenth modification of an example embodiment of the present invention will be described below with reference to the drawings. FIG. 15 is a cross-sectional view of the multilayer substrate 10*m*. FIG. 16 is a top view of the multilayer substrate 10*m*.

The multilayer substrate 10*m* is different from the multilayer substrate 10 mainly in the following points.

The thickness of the first multilayer body 12*a* in the up-down direction is smaller than the thickness of the second multilayer body 12*b* in the up-down direction.

The second region A2 surrounds the first region A1 when viewed in the up-down direction.

More specifically, the first multilayer body 12*a* includes the first insulator layers 16*a* to 16*d* stacked in the up-down direction and the first conductor layers 20*a* to 20*d* fixed to the lower main surfaces of the first insulator layers 16*a* to 16*d*. The second multilayer body 12*b* includes the second insulator layers 17*a* to 17*e* and a second insulator layer 17*f* stacked in the up-down direction and the second conductor layers 21*a* to 21*e* and a second conductor layer 21*f* fixed to the lower main surfaces of the second insulator layers 17*a* to 17*f*. With such a structure, the thickness of the first multilayer body 12*a* in the up-down direction is smaller than the thickness of the second multilayer body 12*b* in the up-down direction. As illustrated in FIG. 16, the first multilayer body 12*a* surrounds the second multilayer body 12*b* when viewed in the up-down direction. Thus, the second region A2 surrounds the first region A1 when viewed in the up-down direction. In the multilayer substrate 10*m*, the thickness of the first multilayer body 12*a* in the up-down direction is smaller than the thickness of the second multilayer body 12*b* in the up-down direction, and thus the flexibility of the second region A2 is increased. The other structures of the multilayer substrate 10*m* are the same or substantially the same as those of the multilayer substrate 10, and thus the description thereof is omitted. The multilayer substrate 10*m* can achieve the same advantageous effects as the multilayer substrate 10.

Other Example Embodiments

The multilayer substrate according to the present invention is not limited to the multilayer substrates 10 and 10*a* to 10*m*, and can be changed within the scope of the present invention. The configurations of the multilayer substrates 10 and 10*a* to 10*m* may be arbitrarily combined.

The number of first conductor layers 20*c* (intermediate region first conductor layers) located in the intermediate region A12 may be two or more. In this case, the entirety or substantially the entirety of each of the two or more intermediate region first conductor layers is located in the intermediate region A12.

The thickness in the up-down direction of at least one of the positive region first conductor layers may be larger than the thickness in the up-down direction of one or more of the intermediate region first conductor layers. Therefore, the thickness in the up-down direction of one positive region first conductor layer may be larger than the thickness in the up-down direction of one or more intermediate region first conductor layers, or the thickness in the up-down direction of two or more positive region first conductor layers may be larger than the thickness in the up-down direction of one or more intermediate region first conductor layers.

The first insulator layers 16*a* to 16*f* need not be made of a single material. For example, the first insulator layer 16*b* may be an adhesive layer that adheres the first insulator layer 16*a* to the first insulator layer 16*c*. In this case, the material of the first insulator layers 16*a* and 16*c* is different from the material of the first insulator layer 16*b*.

The number of positive region first conductor layers is not limited to two. The number of positive region first conductor layers may be one, or three or more.

The number of negative region first conductor layers is not limited to three. The number of negative region first conductor layers may be one or two, or may be four or more.

For example, in the multilayer substrate 10, the thicknesses of the first insulator layers 16*a* to 16*f* in the up-down direction and the thicknesses of the second insulator layers 17*a* to 17*e* in the up-down direction are uniform. In the multilayer substrate 10*l*, the thicknesses of the first insulator layers 16*a* and 16*b* in the up-down direction are different from each other, and are also different from the first insulator layers 16*c* to 16*f* and the second insulator layers 17*a* to 17*e*. As described above, the thicknesses of the first insulator layers 16*a* to 16*f* in the up-down direction and the thicknesses of the second insulator layers 17*a* to 17*f* in the up-down direction may be uniform or may be non-uniform.

The protection layers 18, 18*a*, and 18*b* may include openings through which the conductor layers are exposed to connect to other elements.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer substrate comprising:

a first multilayer body including a plurality of first insulator layers stacked in a Z-axis direction;

a second multilayer body including a plurality of second insulator layers stacked in the Z-axis direction; and a plurality of first conductor layers in the first multilayer body; wherein the second multilayer body is positioned in a positive direction of a Z-axis of the first multilayer body;

the second multilayer body is fixed to the first multilayer body via the first insulator layer being bonded to the second insulator layer;

a first region in which the first multilayer body and the second multilayer body are provided when viewed in the Z-axis direction and a second region in which the first multilayer body is provided and the second multilayer body is not provided when viewed in the Z-axis direction are provided;

regions obtained by dividing the first multilayer body into three equal or substantially equal portions in the Z-axis direction are defined as a positive region, an intermediate region, and a negative region;

the positive region, the intermediate region, and the negative region are arranged in this order toward a negative direction of the Z-axis;

the plurality of first conductor layers include one or more positive region first conductor layers and one or more intermediate region first conductor layers;

at least a portion of each of the one or more positive region first conductor layers is located in the positive region;

an entirety or substantially an entirety of each of the one or more intermediate region first conductor layers is located in the intermediate region; and a thickness in the Z-axis direction of at least one of the one or more positive region first conductor layers is larger than a thickness in the Z-axis direction of the one or more intermediate region first conductor layers.

2. The multilayer substrate according to claim 1, wherein the plurality of first insulator layers include a first insulator layer on a most positive side positioned farthest in the positive direction of the Z-axis among the plurality of first insulator layers in the first multilayer body;

the plurality of first conductor layers include a negative-side adjacent first conductor layer, the negative-side adjacent first conductor layer being in contact with a main surface of the first insulator layer on the most positive side, the main surface being positioned in the negative direction of the Z-axis; and a thickness in the Z-axis direction of a portion of the first insulator layer on the most positive side that is in contact with the negative-side adjacent first conductor layer is smaller than a thickness in the Z-axis direction of the negative-side adjacent first conductor layer.

3. The multilayer substrate according to claim 1, wherein the plurality of first conductor layers include a first conductor layer on a most positive side positioned farthest in the positive direction of the Z-axis among the conductor layers in the first multilayer body; and a thickness in the Z-axis direction of the first conductor layer on the most positive side is larger than a thickness in the Z-axis direction of the one or more intermediate region first conductor layers.

4. The multilayer substrate according to claim 1, wherein each of the plurality of first conductor layers includes a first main surface and a second main surface with a surface roughness larger than a surface roughness of the first main surface; and the second main surface of each of the plurality of first conductor layers is in contact with a respective one of the plurality of first insulator layers.

5. The multilayer substrate according to claim 4, further comprising:

a protection layer covering a surface of the first multilayer body positioned in the negative direction of the Z-axis; wherein the second main surface of the first conductor layer is not in contact with the protection layer.

6. The multilayer substrate according to claim 1, wherein one of the plurality of first conductor layers is located on a main surface of the first insulator layer positioned farthest in the positive direction of the Z-axis among the plurality of first insulator layers, the main surface being positioned in the positive direction of the Z-axis; and another one of the plurality of first conductor layers is located on a main surface of the first insulator layer positioned farthest in the negative direction of the Z-axis among the plurality of first insulator layers, the main surface being positioned in the negative direction of the Z-axis.

7. The multilayer substrate according to claim 1, wherein the plurality of first conductor layers include one or more negative region first conductor layers;

at least a portion of each of the one or more negative region first conductor layers is located in the negative region; and a thickness in the Z-axis direction of at least one of the one or more negative region first conductor layers is larger than a thickness in the Z-axis direction of the one or more intermediate region first conductor layers.

8. The multilayer substrate according to claim 1, wherein at least one of the one or more positive region first conductor layers overlaps a boundary between the first region and the second region when viewed in the Z-axis direction.

9. The multilayer substrate according to claim 1, further comprising:

a plurality of second conductor layers provided in the second multilayer body; wherein a thickness in the Z-axis direction of the second conductor layers located at both ends in the Z-axis direction among the plurality of second conductor layers is larger than a thickness in the Z-axis direction of remaining ones of the second conductor layers.

10. The multilayer substrate according to claim 9, wherein the plurality of second conductor layers define at least one coil.

11. The multilayer substrate according to claim 9, wherein each of the plurality of second conductor layers includes a copper foil.

12. The multilayer substrate according to claim 1, wherein a thickness of the first multilayer body in the Z-axis direction is smaller than a thickness of the second multilayer body in the Z-axis direction.

13. The multilayer substrate according to claim 1, wherein each of the plurality of first conductor layers includes a copper foil.

14. The multilayer substrate according to claim 1, wherein a protection layer covers a lower surface of the first multilayer body.

15. The multilayer substrate according to claim 14, wherein a material of the protection layer is different from a material of the plurality of first insulator layers.

16. The multilayer substrate according to claim 1, wherein each of the plurality of second insulator layers includes a thermoplastic resin.

17. The multilayer substrate according to claim 16, wherein the thermoplastic resin is a liquid crystal polymer.

*     *     *     *     *